US006779548B2

(12) United States Patent
McKeary

(10) Patent No.: US 6,779,548 B2
(45) Date of Patent: Aug. 24, 2004

(54) CHEMICAL INJECTION SYSTEM AND METHOD

(75) Inventor: Leonard E. McKeary, Chestermere (CA)

(73) Assignee: Cody Liners Ltd., Chestermere (CA)

(*) Notice: Subject to any disclaimer, the term of this patent is extended or adjusted under 35 U.S.C. 154(b) by 16 days.

(21) Appl. No.: 10/290,007

(22) Filed: Nov. 6, 2002

(65) Prior Publication Data

US 2003/0118488 A1 Jun. 26, 2003

Related U.S. Application Data

(60) Provisional application No. 60/331,008, filed on Nov. 6, 2001.

(51) Int. Cl.[7] .................................................. G05D 7/06

(52) U.S. Cl. ....................... 137/205.5; 48/190; 137/206

(58) Field of Search ......................... 137/101.11, 205.5, 137/206; 48/190, 195

(56) References Cited

U.S. PATENT DOCUMENTS

| | | | |
|---|---|---|---|
| 611,871 | A | 10/1898 | Sumner |
| 1,601,478 | A | 9/1926 | Oswald |
| 2,058,508 | A | 10/1936 | Rolle |
| 2,142,212 | A | 1/1939 | Russell |
| 2,266,981 | A | 12/1941 | Miller |
| 2,935,391 | A | 5/1960 | Evans et al. |
| 6,314,978 | B1 | 11/2001 | Lanning et al. |

*Primary Examiner*—Gerald A. Michalsky
(74) *Attorney, Agent, or Firm*—Blakely, Sokoloff, Taylor & Zafman LLP

(57) ABSTRACT

The invention relates to a method and a system for automatically injecting chemicals into a pressurized system.

15 Claims, 2 Drawing Sheets

CHEMICAL INJECTION SYSTEM AND METHOD

The present application claims the benefit of the filing date of U.S. Provisional Application No. 60/331,008, filed Nov. 6, 2001.

FIELD OF THE INVENTION

The invention relates to a method and a system for automatically injecting chemicals into a pressurized system.

BACKGROUND OF THE INVENTION

In various industries such as the petroleum industry, fluids or chemicals often need to be introduced into pressurized systems including pipelines and other apparatus for various purposes. In particular, it is often necessary to introduce alcohols such as monohydric aliphatic alcohols (for example, methanol) or secondary butyl alcohol into pressurized pipelines to prevent pipeline freeze-up in cold regions.

At the present time in the petroleum industry, reciprocating diaphragm pumps driven by a gas are generally used for injecting chemicals into pipelines. The pumps, by virtue of their reciprocating action, use large volumes of gas to drive the diaphragms. While effective in injecting the desired chemical into the pipeline, the primary drawback of these systems is that ultimately pump gas is vented into the atmosphere on each pump stroke. Pump gas is both harmful to the atmosphere and expensive to operate. Accordingly, there has been a need in the petroleum industry for an injection system which does not vent large quantities of gas to the atmosphere with the attendant benefits of reducing the requirements for high volume pressure equipment and the associated operational costs.

U.S. Pat. No. 2,266,981 (Miller) discloses a method and apparatus for injecting chemicals into a natural gas pipeline for inhibiting the formation of solid gas hydrate within the pipeline in cold temperatures. The apparatus teaches a fluid supply tank for storing the chemical to be injected, a pressure feed tank for pressurizing and injecting the chemical into the pipeline and a series of lines, manual valves and gauges for controlling the flow of chemicals from the supply tank into the feed tank and ultimately into the pipeline using gravity. However, while this system may be effective in injecting chemicals into a pipeline, the system requires manual operation of the valves as well as constant monitoring to ensure that a continuous and regulated amount of chemical is supplied to the pipeline.

Further, some chemical injection systems in industries other than the petroleum industry also provide elements similar to U.S. Pat. No. 2,266,981. For instance, U.S. Pat. No. 2,935,391 (Evans) and U.S. Pat. No. 611,871 (Sumner) generally teach apparatus for adding a chemical to a product and include a supply drum, a pressure vessel and a series of manual valves and gauges for controlling the flow of chemical through the apparatus into the product. The apparatus taught by each of these references requires manual operation of the valves and constant monitoring to ensure a continuous amount of chemical is supplied in consistent quantities to the pipeline.

Accordingly, there has been a need for an injection system which automates the injection of chemicals into pressurized systems without the problems associated with the prior art.

SUMMARY OF THE INVENTION

An object of the present invention is to provide an injection method and system for automatically controlling valve operation and automatically controlling the quantity of chemical injected into a pressurized system. With particular regard to the petroleum industry, a further object of the present system is to reduce the quantity of pumping gas and eliminate the need for a high volume pressure vessel while, by virtue of the system, eliminate the need for a pump.

In one embodiment, the invention provides a system for introducing a chemical into a pressurized system comprising:

- a low pressure storage tank for storing a volume of chemical at a low pressure;
- a high pressure storage vessel in fluid communication with the low pressure storage tank and the pressurized system; and
- a control system in operative communication with the high pressure storage vessel for automatically equalizing the pressure between the low pressure storage tank and the high pressure storage vessel, for automatically equalizing the pressure between the high pressure storage vessel and the pressurized system and for controlling the flow of chemical through the system.

In a further embodiment, the control system includes a micro-controller having a level sensor within the high pressure storage vessel for detecting the level of chemical in the high pressure storage vessel. The control system may also include at least one vent valve operatively connected to the high pressure storage vessel for venting the pressure of the high pressure storage vessel and at least one pressure valve operatively connected to the high pressure storage vessel for opening to a pressure equalization line operatively connected to the pressurized system for equalizing the pressure of the high pressure storage vessel with the pressure of the pressurized system.

In a still further embodiment, the system includes either a control valve or a check valve operatively connected to a flow line between the low pressure storage tank and the high pressure storage vessel to prevent chemical from flowing back into the low pressure storage tank once the high pressure storage vessel is pressurized. A control valve or check valve may also be operatively connected to a flow line between the high pressure storage vessel and the pressurized system to prevent chemical from flowing back into the high pressure storage vessel when the high pressure storage vessel is being depressurized. If a control valve is used then it is operatively connected and controlled by the control system.

In other embodiments the system includes a rate gauge for determining the rate of chemical injection into the pressurized system, a weir for restricting the flow of chemical within the high pressure storage vessel and other useful features which enhance the utility of the system as will become apparent in the discussion below.

The invention also provides a method for automatically introducing a chemical into a pressurized system comprising:

- filling a low pressure storage tank with chemical;
- equalizing the pressure of a high pressure storage vessel to the pressure of the low pressure storage tank;
- filling the high pressure storage vessel with chemical from the low pressure storage tank;
- equalizing the pressure of the high pressure storage vessel to the pressure of the pressurized system; and
- injecting chemical into the pressurized system from the high pressure storage vessel wherein the pressure of the high pressure storage vessel and the flow of chemical from the low pressure storage tank to the high pressure storage vessel and from the high pressure storage vessel into the pressurized system is automatically controlled by a control system.

BRIEF DESCRIPTION OF THE DRAWINGS

The invention is described by the following description and drawings in which.

DETAILED DESCRIPTION OF THE INVENTION

Figure 1:
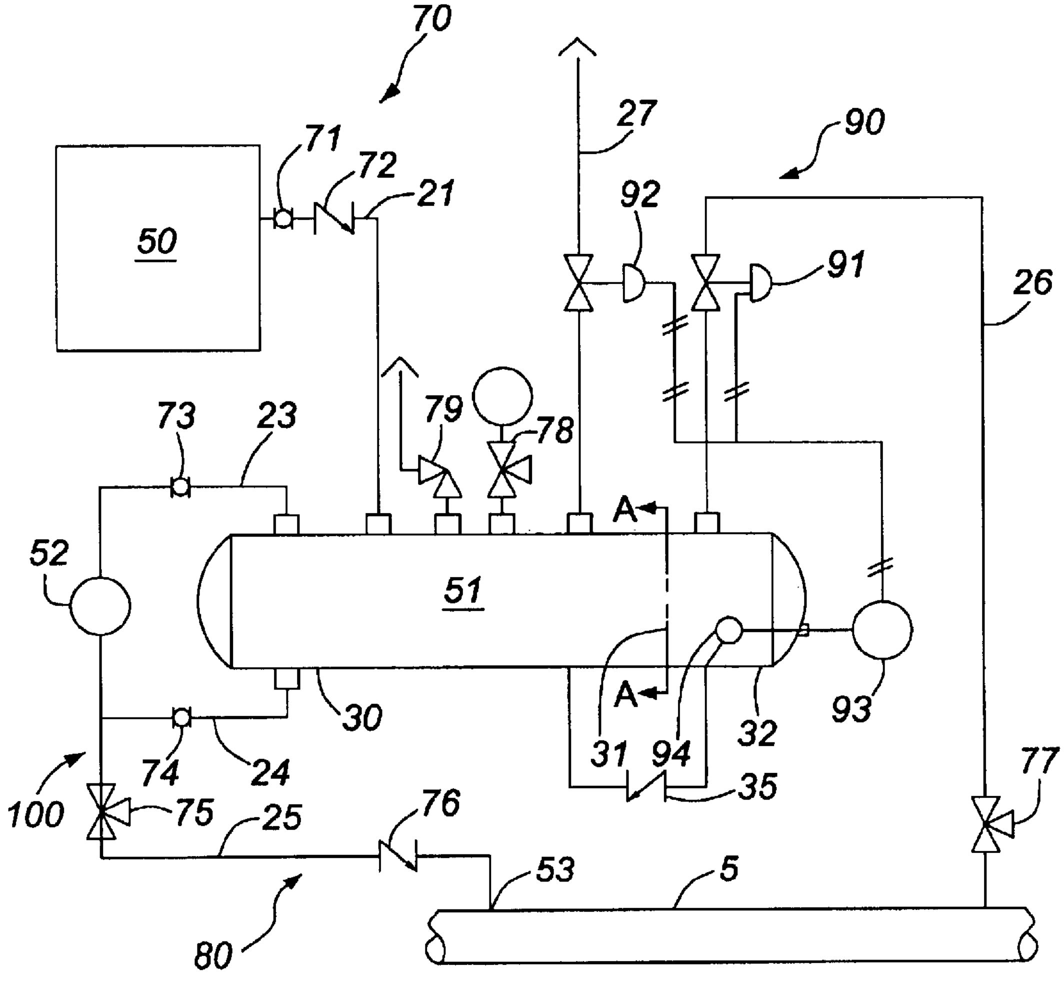
FIG. 1 shows a section view of the chemical injection system in accordance with one embodiment of the invention.

With reference to the Figures, a chemical injection method and system 100 are described that enable the introduction of a chemical into a pressurized system 5 at an injection point 53.

System 100 includes a chemical storage tank 50 for storing a large volume of a chemical to be injected, a higher pressure chemical storage vessel 51 for storing a smaller and pressurized volume of the chemical be injected and a control system 90 for controlling the flow of low pressure chemical from the low pressure chemical storage tank 50 to the higher pressure chemical storage vessel 51 and from vessel 51 into pressurized system 5 at chemical injection point 53.

Generally, chemical storage tank 50 is a larger volume, low pressure tank and chemical storage vessel 51 is a smaller volume, high pressure (typically 0–1500 psi) vessel.

Control system 90 includes a pressure valve 91 for opening and closing a pressure equalizing line 26 operatively connected to pressurized system 5, a vent valve 92 for opening and closing a vent 27, and a level sensor 94 for measuring the level of chemical in vessel 51 and a micro-controller 93 operatively connected to the level sensor 94 and valves 91 and 92 for automatic signal processing and valve control.

In addition, the system also includes a first valve system 70 between the chemical storage tank 50 and vessel 51 and a second valve system 80 between the higher pressure vessel 51 and the pressurized system 5. The valves within the first and second valve systems may be passive, manual or automatically operated in accordance with different embodiments of the invention. Thus, it is understood that different combinations of valves may be employed as understood by those skilled in the art.

The operation of control system 90 along with the other elements of chemical injection system 100 is described as follows:

Initial Stage

In the initial stage, prior to filling vessel 51, a volume of chemical is stored in chemical storage tank 50. Preferably, a flow valve 71 is closed for preventing the chemical from entering into chemical storage vessel 51 which remains empty and at atmospheric pressure during the initial stage.

Filling Stage

When level sensor 94 determines that vessel 51 is empty and an empty signal is received by micro-controller 93, micro-controller 93 closes valve 91 and opens valve 92 to vent 27 allowing vessel 51 to depressurize to atmospheric pressure. Valve 71 is opened (if previously closed) and chemical begins to flow under gravity from storage tank 50 to vessel 51 through line 21 until vessel 51 is filled to an appropriate level.

Figure 2:
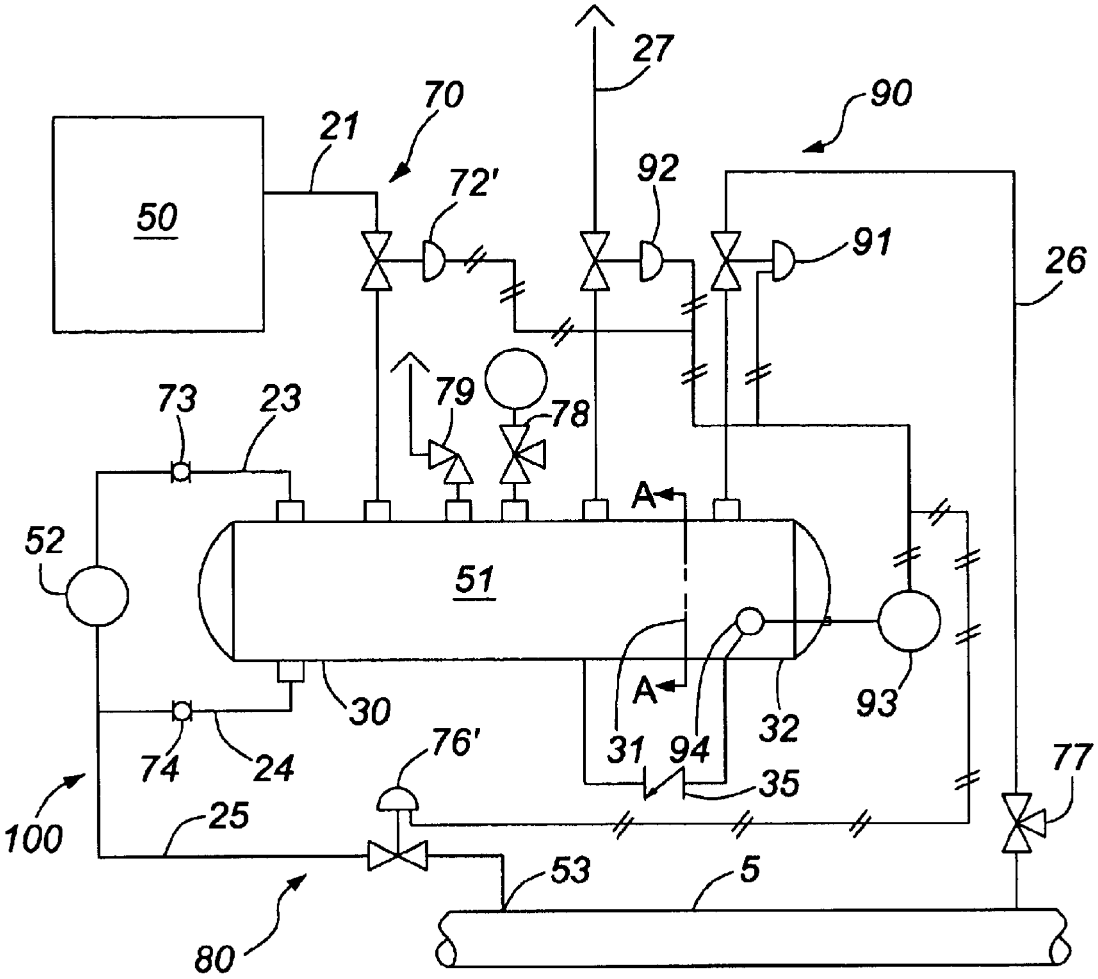
FIG. 2 shows a section view of the chemical injection system in accordance with a further embodiment of the invention; and, FIG. 3 shows a cross sectional view of FIGS. 1 and 2 at line A—A.

A passive check valve 72 is preferably located on line 21 for preventing chemical from flowing back up line 21 as vessel 51 is pressurized as described below. In another embodiment, as shown in FIG. 2, valves 71 and 72 may be combined as a single automatically actuated valve 72' under the control of control system 90.

Injection Stage

When level sensor 94 determines that vessel 51 is full and a full signal is received by micro-controller 93, micro-controller 93 closes valve 92 and opens valve 91 to pressure equalization line 26, thereby pressurizing vessel 51 until the pressure within vessel 51 is equal to the pressure of pressurized system 5. Preferably, line 26 is connected to pressurized system 5 in order that the pressure inside vessel 51 is the same as the pressurized system's pressure. As the pressure in vessel 51 equalizes that of pressurized system 5, the chemical flow under gravity from vessel 51 to injection point 53 and into pressurized system 5.

Valve 76 is located along line 25 for preventing the flow of chemical from the pressurized system 5 into vessel 51 and for preventing the pressure of pressurized system 5 from pressurizing vessel 51 when vessel 51 is being refilled. Valve 76 may be a passive check valve or a control valve 76' which may be connected to and controlled by control system 90 as shown in FIG. 2. The advantage of using passive check valves both upstream and downstream of the pressure vessel 51 is that unless the pressure is equalized between the pressure vessel side of valve 76 and the pipeline system side of valve 76, chemical will not flow into pressurized system 5. Similarly on the upstream side, chemical will not flow from the storage tank 50 to the vessel 51 if the pressure is not equalized on both sides of valve 72.

In one embodiment, a valve 75 is located on line 25 for controlling the rate of chemical injection from the vessel 51 into the pressurized system 5. Valve 75 is preferably a fine control needle valve. In a further embodiment and as shown in FIG. 2, valve 75 may be combined with valve 76 as a single automatically actuated valve 76' under the control of control system 90.

In another embodiment, the rate at which the chemical is being injected into pressurized system 5 at chemical injection point 53 can be calculated by incorporating a rate gauge 52 into the system 100. Rate gauge 52 is positioned at the same horizontal plane as vessel 51 and is in fluid communication with vessel 51 through lines 23 and 24. Rate gauge 52 maintains the same pressure as vessel 51 and holds a small quantity of chemical. By closing a valve 73 and a valve 74, located respectively on lines 23 and 24, chemical will flow from the rate gauge 52 to the chemical injection point 53 during the injection stage. By recording the change in level of chemical in rate gauge 52 and the amount of time, the rate of flow can be calculated.

Figure 3:
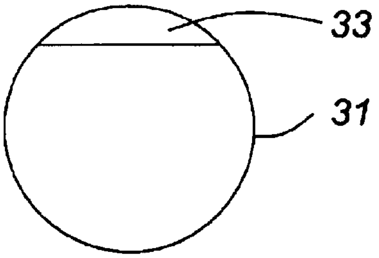

In another embodiment, vessel 51 includes a weir 31 as best shown in FIG. 3. Vessel 51 receives chemical from line 21 at a first end 30 of vessel 51 and weir 31 is located at a second end 32 of vessel 51 which is opposite first end 30 of vessel 51. Once the first end 30 of vessel 51 is nearly full, the chemical will flow over weir 31 between an opening 33 defined by weir 31 and vessel 51 and fill the second end 32 of vessel 51 containing level sensor 94. This embodiment ensures that the first end 30 of vessel 51 is nearly full of chemical before micro-controller 93 receives a signal that vessel 51 is full and subsequently changes the open or closed position of valve 91 or 92. In a further embodiment, each end 30, 32 of vessel 51 are in fluid communication through a check valve 35 which allows the chemical to flow from the second end 32 to the first end 30 of vessel 51 when the first end 30 of vessel 51 is empty.

In another embodiment, several safety valves may be introduced to vessel 51 to prevent potential damage due to over-pressurization. In particular, pressure indicator 78 and pressure safety valve 79 may be installed respectively for allowing an operator to observe the pressure within vessel 51 and for automatically releasing the pressure in vessel 51 if the pressure in vessel 51 exceeds operational limits. Further, a valve 77 along pressure equalization line 26 may be used to govern the rate of pressurization for safety purposes and for maintenance of the system as is understood by those skilled in the art.

Refilling Stage

When level sensor 94 determines that vessel 51 is empty and micro-controller 93 receives a signal that vessel 51 is empty, micro-controller 93 closes valve 91 and opens valve 92 to vent 27 for allowing vessel 51 to depressurize to atmospheric pressure for repeating the filling stage. Chemical injection system 100 injects a desired amount of chemical into the pressurized system 5 by selectively equalizing the pressure between storage tank 50 and vessel 51 and between vessel 51 and pressurized system 5 without requiring manual operation of the control or flow valves. Once the chemical from vessel 51 has been injected into pressurized system 5, chemical injection system 100 automatically resets to refill vessel 51 to continue injection into pressurized system 5.

The repetitive process of injecting and refilling is of benefit to the petroleum industry as the process reduces the gas consumption of the system compared to conventional pumps and further dramatically reduces the maintenance costs of the subject system as compared to conventional pumps.

APPLICATION

The system may be implemented in various applications where a chemical is introduced into a pressurized system. As indicated, the system is particularly useful in the petroleum industry for pressurized pipelines. In addition and due to the automatic control features of the system, applications where service personnel or physical size restrictions prevent or restrict access of the system, the invention is particularly advantaged.

What is claimed is:

1. A system for introducing a chemical into a pressurized system comprising:

a low pressure storage tank for storing a volume of chemical at a low pressure;

a high pressure storage vessel in fluid communication with the low pressure storage tank and the pressurized system; and a control system in operative communication with the high pressure storage vessel for automatically equalizing the pressure between the low pressure storage tank and the high pressure storage vessel, for automatically equalizing the pressure between the high pressure storage vessel and the pressurized system and for controlling the flow of chemical through the system.

2. A system as in claim 1 wherein the control system includes a micro-controller having a level sensor within the high pressure storage vessel.

3. A system as in claim 2 wherein the high pressure storage vessel includes a weir for preventing chemical from flowing from a first end of the high pressure storage vessel to a second end of the high pressure storage vessel having the level sensor until the first end of the high pressure storage vessel is nearly full.

4. A system as in claim 3 wherein the first end and second end of the high pressure storage vessel are in fluid communication through a check valve for allowing chemical to flow from the second end of the high pressure storage vessel to the first end of the high pressure storage vessel when the first end of the high pressure storage vessel is approaching empty.

5. A system as in claim 1 wherein the control system includes at least one vent valve operatively connected to the high pressure storage vessel for venting the pressure of the high pressure storage vessel.

6. A system as in claim 1 wherein the control system includes at least one pressure valve operatively connected to the high pressure storage vessel and a pressure equalizing line operatively connected to the pressurized system, the pressure valve for equalizing the pressure of the high pressure storage vessel with the pressure of the pressurized system.

7. A system as in claim 1 further comprising a check valve operatively connected to a flow line between the low pressure storage tank and the high pressure storage vessel for preventing chemical from flowing back into the low pressure storage tank once the high pressure storage vessel is pressurized.

8. A system as in claim 1 further comprising a check valve operatively connected to a flow line between the high pressure storage vessel and the pressurized system for preventing chemical from flowing back into the high pressure storage vessel when the high pressure storage vessel is being depressurized.

9. A system as in claim 1 further comprising a control valve operatively connected to a flow line between the low pressure storage tank and the high pressure storage vessel and controlled by the control system for preventing chemical from flowing back into the low pressure storage tank once the high pressure storage vessel is pressurized.

10. A system as in claim 1 further comprising a control valve operatively connected to a flow line between the high pressure storage vessel and the pressurized system and controlled by the control system for preventing chemical from flowing back into the high pressure storage vessel when the high pressure storage vessel is being depressurized.

11. A system as in claim 1 further comprising a rate gauge operatively connected to a flow line between the high pressure storage vessel and the pressurized system for determining the rate of chemical injection into the pressurized system.

12. A system as in claim 1 further comprising a valve operatively connected to a flow line between the high pressure storage vessel and the pressurized system for controlling the rate of chemical flow into the pressurized system from the high pressure storage vessel.

13. A system as in claim 1 wherein the high pressure storage vessel includes a pressure indicator and a pressure safety valve for respectively allowing an operator to observe the pressure within the high pressure storage vessel and for allowing for the release of pressure of the high pressure storage vessel if the pressure exceeds operational limits.

14. A system for introducing a chemical into a pressurized system comprising:

a low pressure storage tank for storing a volume of chemical at a low pressure;

a high pressure storage vessel in fluid communication with the low pressure storage tank and the pressurized system; and a control system in operative communication with the high pressure storage vessel for automatically equalizing the pressure between the low pressure storage tank and the high pressure storage vessel, for automatically equalizing the pressure between the high pressure storage vessel and the pressurized system and for controlling the flow of chemical through the system wherein the control system includes:

a micro-controller having a level sensor within the high pressure storage vessel, at least one vent valve operatively connected to the high pressure storage vessel for venting the pressure of the high pressure storage vessel, and at least one pressure valve operatively connected to the high pressure storage vessel and a pressure equalizing line operatively connected to the pressurized system, the pressure valve for equalizing the pressure of the high pressure storage vessel with the pressure of the pressurized system.

15. A method for automatically introducing a chemical into a pressurized system comprising:

filling a low pressure storage tank with chemical;

equalizing the pressure of a high pressure storage vessel to the pressure of the low pressure storage tank;

filling the high pressure storage vessel with chemical from the low pressure storage tank;

equalizing the pressure of the high pressure storage vessel to the pressure of the pressurized system; and injecting chemical into the pressurized system from the high pressure storage vessel wherein the pressure of the high pressure storage vessel and the flow of chemical from the low pressure storage tank to the high pressure storage vessel and from the high pressure storage vessel into the pressurized system is automatically controlled by a control system.

* * * * *